US007875142B2

(12) United States Patent
Matthews et al.

(10) Patent No.: US 7,875,142 B2
(45) Date of Patent: Jan. 25, 2011

(54) MULTI-PLY WRAP LABEL

(75) Inventors: Lowell F. Matthews, Incline Village, NV (US); Kyle J. Putzier, Anaheim, CA (US); Craig J. Wiener, Placentia, CA (US); Joseph Carlos Page, Garden Grove, CA (US)

(73) Assignee: Wisconsin Label Corporation, Algoma, WI (US)

(*) Notice: Subject to any disclaimer, the term of this patent is extended or adjusted under 35 U.S.C. 154(b) by 0 days.

(21) Appl. No.: 12/577,634

(22) Filed: Oct. 12, 2009

(65) Prior Publication Data

US 2010/0084077 A1 Apr. 8, 2010

Related U.S. Application Data

(62) Division of application No. 11/199,450, filed on Aug. 8, 2005, now Pat. No. 7,601,410.

(60) Provisional application No. 60/599,925, filed on Aug. 9, 2004, provisional application No. 60/672,472, filed on Apr. 18, 2005.

(51) Int. Cl.

| | |
|---|---|
| ***B29C 65/48*** | (2006.01) |
| ***B32B 37/22*** | (2006.01) |
| ***B32B 37/26*** | (2006.01) |
| ***B32B 38/04*** | (2006.01) |
| ***B32B 38/12*** | (2006.01) |
| ***B32B 43/00*** | (2006.01) |

(52) U.S. Cl. ....................... 156/156; 156/182; 156/247; 156/248; 156/249; 156/263; 156/265; 156/277

(58) Field of Classification Search ................. 156/152, 156/182, 247–250, 263, 265, 277, 289, 324; 283/81, 98, 99, 101, 103, 105, 110; 428/40.1, 428/41.8, 42.2

See application file for complete search history.

(56) References Cited

U.S. PATENT DOCUMENTS

| | | | |
|---|---|---|---|
| 4,727,667 | A | 3/1988 | Ingle |
| 5,284,363 | A | 2/1994 | Gartner et al. |
| 5,342,093 | A | 8/1994 | Weernink |
| 5,389,415 | A | 2/1995 | Kaufmann |
| 6,752,431 | B1 | 6/2004 | Matthews et al. |
| 6,941,689 | B1 | 9/2005 | Seidl |
| 7,448,153 | B2 | 11/2008 | Maliner et al. |
| 2004/0041392 | A1 | 3/2004 | Seidl |
| 2005/0136207 | A1 | 6/2005 | Moosheimer et al. |
| 2005/0275213 | A1 | 12/2005 | Whitehouse et al. |

FOREIGN PATENT DOCUMENTS

| | | |
|---|---|---|
| GB | 2238772 | 6/1991 |
| GB | 2310418 | 8/1997 |

*Primary Examiner*—Philip C Tucker
*Assistant Examiner*—Sing P Chan
(74) *Attorney, Agent, or Firm*—Reinhart Boerner Van Deuren s.c.

(57) ABSTRACT

A multi-ply, expanded content wrap label includes a base ply and an upper ply thereon with adhesive applied to the underside of a trailing end of the base ply to form a splice between the base ply and the upper side of the upper ply when the label is applied to a container.

16 Claims, 17 Drawing Sheets

MULTI-PLY WRAP LABEL

CROSS REFERENCE TO RELATED APPLICATIONS

This patent application is a division of U.S. patent application Ser. No. 11/199,450 now U.S. Pat. No. 7,601,410, filed on Aug. 8, 2005, entitled "Multi-Ply Wrap Label," which patent application is assigned to the assignee of the present invention, and which patent application claimed priority of U.S. Provisional Patent Application No. 60/599,925, which is entitled "Multi-Ply Wrap Label," which patent application was filed on Aug. 9, 2004, and U.S. Provisional Patent Application No. 60/672,472, which is entitled "Multi-Wrap Label," which patent application was filed on Apr. 18, 2005, all three of which patent applications are hereby incorporated herein by reference in their entirety.

BACKGROUND OF THE INVENTION

Field of the Invention

This invention relates to labels and more particularly, extended or expanded content labels for use on containers, for example.

The packaging industry has long had an interest in the manufacture and use of specially designed labels as a means of increasing available graphic and text area where use of a common single ply label affixed to a container would lack such extra print space. The demand for increased label print space arises from governmental labeling laws, need for multiple language instructions and warnings, promotional messages, and the like. The term "expanded content label" (ECL) is used to refer to such labels that provide more than one exposed label surface for printing.

Many ECL constructions have been disclosed. Two groups of ECL's relate to this invention, and reference to FIGS. 1a-1d and 2a-2e, respectively, will aid in understanding prior labels in both groups.

One group, the "wrap around" labels, is taught by U.S. Pat. Nos. 4,727,667 and 5,342,093, and others. These labels are formed as a single ply of paper or plastic, with pressure sensitive adhesive on the underside. Prior to application, such labels are normally releasably affixed to a coated liner or carrier, usually in roll form as a stream of individual labels as is common in the industry. As shown in FIG. 1, the typically long label 1 is applied around the entire 360° perimeter of a container 2, and all additional length of the label continues to wrap on itself. The first "wrap" portion 3 of the label is typically printed on one side with text or graphics, with the other side being adhesively coated to enable releasable bonding to the release liner 5, and for affixing said label to the container after application is performed. The second portion 4 of the label which extends beyond the first "wrap" 3, typically is printed on both sides. The second portion also is coated on its underside with a solid or patterned adhesive to enable releasable bonding to the release liner 5 prior to application to the container and enable releasable bonding to the first wrapped portion 3 after application. A release varnish is applied to the upper side of the label to enable opening and resealing of the label for viewing by the end user as shown in FIGS. 1*c*-1*d*.

A second group, which we will refer to as "multi-ply" labels is taught by U.S. Pat. Nos. 5,284,363; 5,389,415 and others and relates to the use of two or more plies of pressure sensitive label material as shown in FIGS. 2*a*-2*e*. Label 10 includes a base ply 6 which normally has pressure sensitive adhesive on its underside for eventual application to a surface such as a package or bottle 2. A second ply of material 7 also with pressure sensitive adhesive on its underside is superposed on the base ply 6. This upper ply 7 can be partially peeled away from the base ply 6 for viewing of text and graphics. This is typically accomplished through the use of release varnish coatings on the upper side of the base ply 6 in those areas that are in contact with the upper ply's adhesive coat. Areas on the base ply 6 without such a release varnish result in a more-or-less permanent bond between the base ply 6 and the upper ply 7. This bonded region 8 acts as a hinge, allowing the upper label ply to be peeled back for viewing and then to be reapplied to the base ply in perfect register.

Both "wrap around" and "multi-ply" labels as are shown in prior art, FIGS. 1 and 2, respectively, have certain inherent limitations.

In regards to "wrap around" labels, they are by definition dimensionally longer, and often significantly longer, in one direction than the circumference of the container (typically a round bottle) to which they are applied. Hence the labels, when applied, completely surround the container's perimeter and continue to wrap a second time, or even more, on the container, successively overlapping the underlying wrap(s) of label material. As such, the "wrap around" designs of prior art have several limitations relating to machine application to containers such as round bottles.

First, the relatively expansive length of the "wrap around" label in comparison to the container circumference often results in the need for expensive, specially modified labeling equipment to apply multiple wraps of label material. The extra length of a "wrap around" label as compared to a standard pressure sensitive label increases the opportunity of misalignment, buckling, or machine jamming during the application process.

Accordingly, it is one objective of this invention to reduce the required length of a "wrap around" label prior to application without reducing the available print area for text and graphics.

Secondly, the combination of the "wrap around" label being extra long and also being comprised of only a single ply of paper or plastic renders the label "flimsy" and more likely to misfeed or jam during the application process.

Accordingly, it is a second objective of this invention to provide a "wrap around" label that is more substantial (i.e. less "flimsy") for improved application characteristics.

Thirdly, the extra long nature of the "wrap around" label as compared to a "multi-ply" label with similar available surface area for printing text and graphics translates to comparatively longer production time. For example, if a 2-ply label, with only half the length can replace a long "wrap around" label, the resultant supply rolls of labels will be approximately half the length, improving label press production efficiencies.

Accordingly, it is a third objective of this invention to provide a "wrap around" label that is smaller in length than current "wrap around" labels, but still retains similar print area for text and graphics.

An additional limitation of current "wrap around" label designs is that as the long, single ply label is applied around a container in wrap fashion, it is now seen as "multilayer" label (one wrap on top of another wrap) with all "layers" being composed of the same label material. It can sometimes be desirable to have different materials on different layers (e.g. paper+film, opaque+clear, etc.) which is not possible with current designs. Such different materials could be used for a variety of functional applications not available in today's "wrap around" labels as described.

Accordingly, it is a fourth objective of this invention to provide a "wrap around" label that can combine two differing materials into the final applied single label "strip."

The "multi-ply" designs of prior art also have several limitations:

The current designs for "multi-ply" ECL labels depict the base label ply as being coextensive with the upper ply, with the occasional exception of an extended peel tab extension. When such labels are applied to curved or non-planar surfaces such as a cylindrical bottle or squeeze tube, the results can be unsatisfactory. Specifically, a "multi-ply" ECL has thickness, and as such, the plies have different radii of curvature when the label is affixed to a curved surface. Consequently, the upper ply will attempt to stretch, or more commonly, the base ply may buckle; or as also happens, one or both opposing edges of the entire label may lift away from the container. T his would particularly be the case if the "multi-ply" label were used as a "wrap" label and extended completely around the container and continued to wrap a second time, overlapping the first wrap of label material.

Accordingly, it is a fifth objective of this invention to reduce or eliminate the likelihood of wrinkling, buckling, or label lifting which occurs when a "multi-ply" label is applied as a "wrap" label to a curved or non-planar surface such as a cylindrical bottle or squeeze tube.

An additional limitation with current "multi-ply" labels relates to the relatively weak bonding strength of the hinge which holds the upper ply to the base label when said label is in an open configuration as would be the case if being opened and viewed by an end user. It is often possible with a minimal amount of pull strength to inadvertently separate the top ply from the base as illustrated in FIG. 2*e*. This can render the label unfit for use, and may even violate governmental labeling laws.

Accordingly, it is a sixth objective of this invention to reduce or eliminate the likelihood that the two plies of the label become inadvertently separated at the user level when being opened and closed for viewing.

SUMMARY OF THE INVENTION

The present invention provides a label that uniquely combines selected characteristics from "multi-ply" labels and from "wrap around" labels in a manner heretofore unknown. Specific constructions of label components result in an exceptional label that applies with the stability of a shorter length "multi-ply" label, but performs similar to a "wrap around" label once having been applied to a container, such as a cylindrical bottle, vial or the like. A transformation from a "multi-ply" to a "wrap around" label occurs during the application process and the subsequent opening of the label by the end-user.

More particularly, in at least one embodiment of the invention, the opposite ends of the base and upper label plies (hereafter referred to as the "base ply" or "upper ply") are adhesively-bonded or fused together at a juncture referred to herein as the "end splice". This "end-splice" transforms the individual upper and base plies into a co-joined, multiple component single extended label strip. This newly fabricated "single strip" is ultimately evident as such when the label is opened for viewing after application to a container. The formation and function of the end-splice described herein renders significant unique and useful advantages over the prior "wrap" or "multi-ply" labels.

Typically, a web of release coated paper or film liner carries the entire label construction normally as a stream or series of labels wound into a roll. The labels are eventually removed from the liner and applied to the containers such as bottles or tubes using machinery with peel plates or rollers as is common to the industry.

Advantages of the multi-ply wrap label of this invention are numerous. Firstly, the present invention provides a base ply and upper ply with available print area that is of shorter length as compared to a typical "wrap around" label with similar total available print area. Secondly, the present invention with its two plies of material is less "flimsy" than a typical single ply "wrap around" label and will be less likely to misfeed during machine label application. Thirdly, the shorter format of this invention as compared to a typical "wrap around" label can translate to improved press efficiencies (less total run footage processed per label). Fourthly, the upper ply and base ply can be of differing materials resulting in a single strip (after application) having two different materials. Fifthly, the use of an upper ply extending past the base ply as a "single layer" enables this invention to be applied to tight radius containers while lessening or eliminating the possibility of wrinkling or buckling as would occur with a typical "multi-ply" label with similar print areas. Sixthly, this invention teaches a shear type splice with significantly more strength than a peel type hinge as seen on current "multi-ply" labels, such as illustrated in FIG. 2.

DESCRIPTION OF THE DRAWINGS

These and other objectives and advantages will become readily apparent from the following written description of embodiments of the invention and from the drawings in which:

FIG. 8*a* illustrates a label on a release liner similar to FIG. 3, but showing a shorter upper ply than in FIG. 3;

FIG. 8*b* illustrates the applied label of FIG. 8*a;*

FIG. 8*c* illustrates the label of FIG. 8*b* but open for viewing;

FIG. 8*d* illustrates a label on a release liner according to the invention similar to FIG. 3, but showing a shorter upper ply than in FIGS. 8*a*-8*c;*

FIG. 8*e* illustrates the applied label of FIG. 8*d;*

FIG. 8*f* illustrates the open-for-viewing label of FIG. 8*e;*

FIG. 9*a* shows a label of the second embodiment on a release liner;

FIG. 9*b* shows the label of FIG. 9*a* in an applied condition;

FIGS. 9*c*-9*d* illustrate the label in various opened conditions;

FIG. 10*a* shows such a label on a release liner;

FIG. 10*b* shows the label of FIG. 10*a* in an applied condition;

FIGS. 10*c*-10*d* illustrate the label of FIGS. 10*a*, 10*b* in various open conditions;

FIG. 11*a* shows the label positioned on a release liner;

FIG. 11*b* shows the label of FIG. 1*a* as applied;

FIG. 11*c* illustrates the label of FIG. 11*b* in a partially opened condition;

FIGS. 11*d*-11*f* show cross-sectional views of the label affixed to a round bottle in various stages of being opened for viewing and/or having a section of the label removed;

Figure 1A:
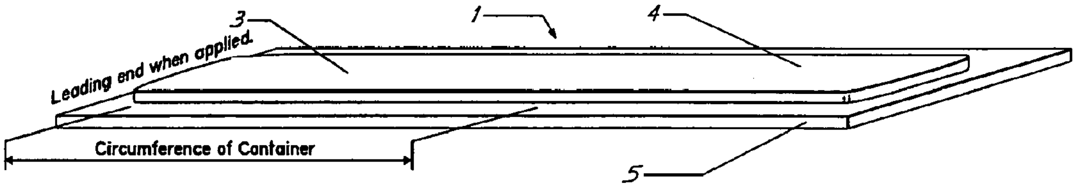
FIG. 1A PRIOR ART
FIGS. 1*a*-1*d* show prior "wrap around" labels, with FIG. 1*a* being a developed label, depicting the label positioned on a release liner, and FIGS. 1*b*-1*d* showing cross-sectional views of the label affixed to a round bottle in various stages of being opened for viewing.
Figure 1B:
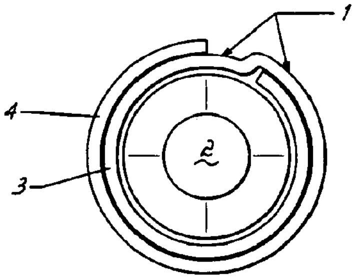
FIG. 1B PRIOR ART
Figure 1C:
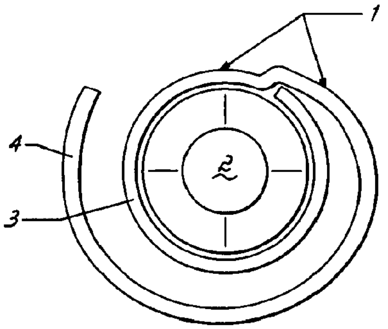
FIG. 1C PRIOR ART
Figure 1D:
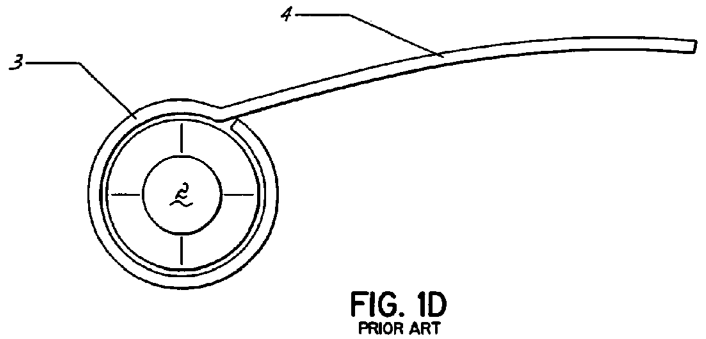
FIG. 1D PRIOR ART

It should be appreciated that all drawings are for purposes of informing. As such, detail and sizing may be omitted or exaggerated to better illustrate the subject matter being discussed, and for clarity. For example, the labels of the various embodiments may be supplied with "peel" tabs (FIG. 6) or with tamper indicating features (FIG. 7) even though such features are not shown in all Figures.

Reference to Figures by numbers alone include those related Figures with the same number followed by letter suffix.

Certain Figures show application to a counterclockwise rotating container. Application to clockwise rotating containers is contemplated within the invention.

DETAILED DESCRIPTION OF THE EXEMPLARY EMBODIMENTS

In order to illustrate the basics of this invention, attention is given to the First embodiment as shown in FIGS. 3, 4, 5, and 8. As seen in FIG. 3, the label 109 is a peel-back, re-sealable multi-ply label with a base ply 110, and an upper ply 111. The label is releasably affixed to a release coated liner 112 prior to application. The upper ply 111 can be shorter (FIG. 8*d*), equal to (FIG. 8*a*), or, as is shown in FIG. 3*a*, longer than the base ply 110 in the direction of application (hereafter referred to as the direction of "length"). As seen in FIGS. 4*a*-*c*, label 109 is released from the liner 112 during machine application to a container such as a round bottle 2. The end portions of both plies dispense from liner 112 with base ply leading end portion 113 and upper ply leading end portion 114 dispensing from the liner first, followed by the remaining portions of both plies. In FIG. 3*a* the leading end portions 113, 114 are illustrated as coextensive on their leading edges 113L and 114L respectively. However, other embodiments will be discussed in which the leading edge portions are not coextensive, but have one or the other of leading edges extending past the other leading edge.

The base ply 110 has an adhesive coating 118 on the lower side to releasably affix it to a release coated liner 112 and ultimately to affix said base ply to a container. Said adhesive 118 is preferably pressure sensitive and can cover substantially the full underside of the base ply 110, or a portion thereof. A portion of this adhesive coating located on the lower side of the base ply trailing end portion 116 will be used in forming the end-splice 115 together with an upper surface of a leading end of the upper ply 111 upon application of the label to target surface, such as container. As seen in FIG. 4*b*, during label application to a container 2, the lower surface of the trailing end portion 116 of the base ply 110 will overlap and become preferably permanently bonded to the upper surface of the leading end portion 114 of the upper ply 111 to form the end-splice 115. This adhesive bonding to form an end splice is typically strong and permanent, but can also be designed to be releasable. Other adhesives for releasably securing the base ply 110 to the liner 112 and then more permanently to a container can be used as desired. Moreover, adhesive for forming splices 115 is preferably applied to the trailing end portion of the base ply under surface. Alternatively, and with modifications to the label application devices now in use, such splice forming adhesive could be applied to the upper surface leading end portion of the upper ply.

Figure 3A:
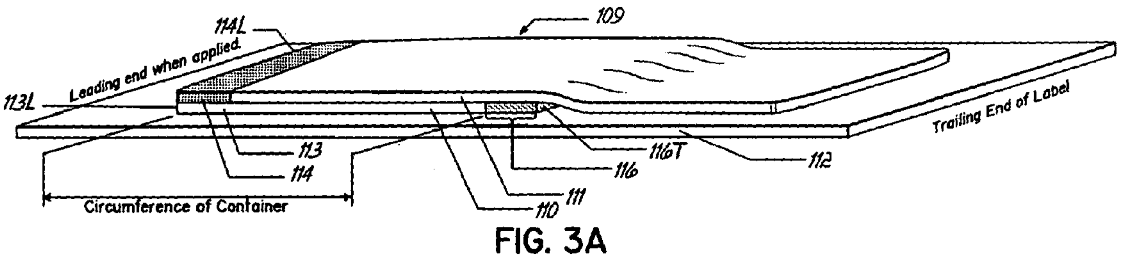
FIG. 3 illustrates a first embodiment of the invention, in which the leading edges of both plies are co-extensive, with FIG. 3*a* depicting the label positioned on a release liner, and FIGS. 3*b*-3*d* showing cross-sectional views of the label affixed to a round container and respectively in various stages of being opened.
Figure 3B:
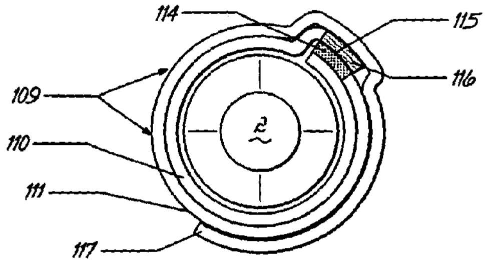
Figure 3C:
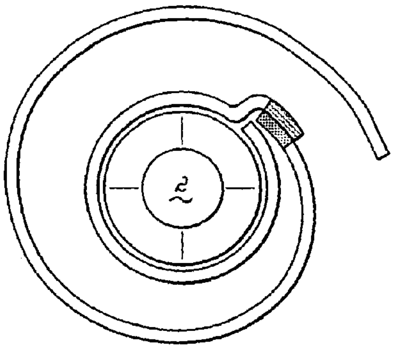

Of significance to the illustrated embodiments of the invention is that, prior to application, and as illustrated in FIG. 3*a*, for example only, the measured distance from the leading edge 114L, of the upper ply 111 to the trailing edge 116T of the base ply 110 is greater than the circumference of the container to which the label is applied. This minimum distance is fundamental and essential in order to enable the formation of an end-splice of upper and base plies. As shown, this end-splice 115 is positioned immediately after a full 360° "wrap" of the base ply as seen in FIG. 3*b*. However, this end-splice can be positioned elsewhere as will be shown in other embodiments.

Figure 2A:
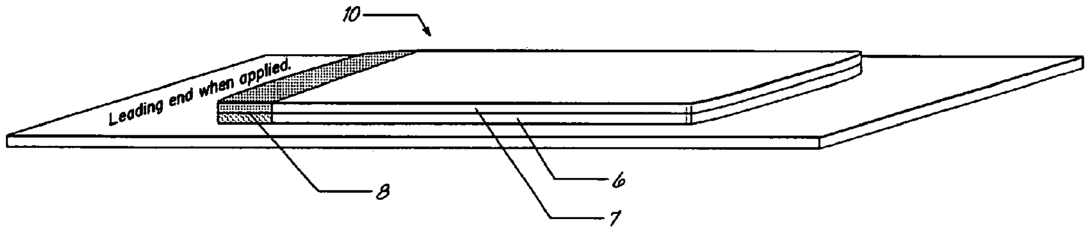
FIG. 2A PRIOR ART
FIGS. 2*a*-2*e* shows prior "multi-ply" labels, with FIG. 2*a* depicting the developed (or laid out configuration) label positioned on a release liner, FIGS. 2*b*-2*d* showing cross-sectional views of the label affixed to a round bottle in various stages of being opened, and FIG. 2*e* illustrating unwanted hinge failure in the prior multi-ply labels.
Figure 2B:
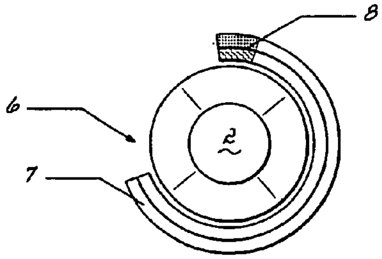
FIG. 2B PRIOR ART
Figure 2C:
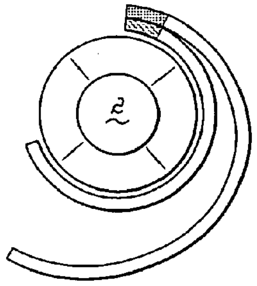
FIG. 2C PRIOR ART
Figure 2D:
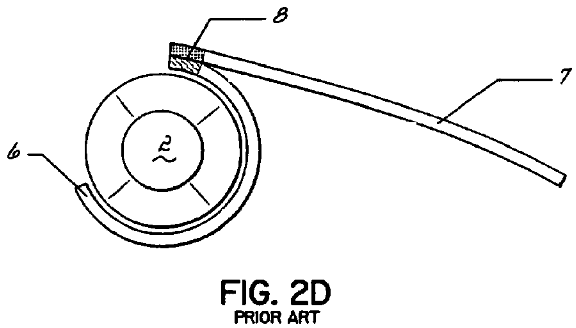
FIG. 2D PRIOR ART
Figure 2E:
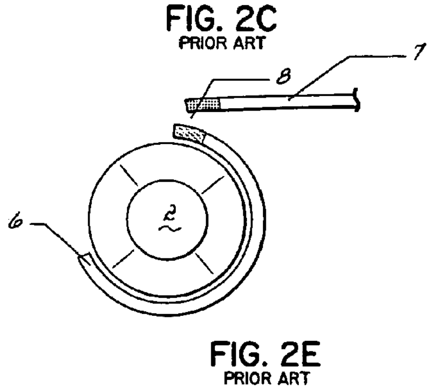
FIG. 2E PRIOR ART
Figure 3D:
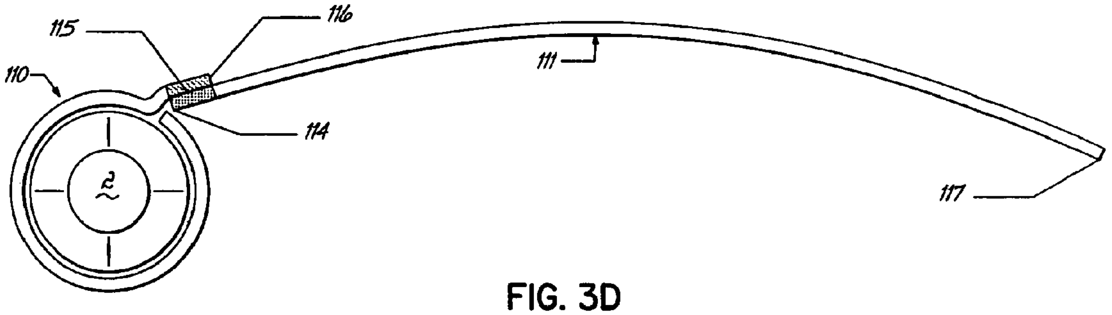

It will further be appreciated that the invention generally contemplates the use of an end splice between the upper and lower plies and which is provided in the label as a "shear" splice rather than a "peel" splice configuration. More specifically, and with particular reference to FIG. 3*d*, for example, upper ply 111 is secured to lower base ply 110 at splice 115. When the upper ply 111 is pulled away from ply 110, for viewing, as is shown in FIG. 3*d*, further tension in ply 111 is applied through splice 115 to ply 110 in a longitudinal direction along the plies, and not transversely thereto. Thus, the splice 115 holds the two plies 110, 111 together in "shear" rather than in "peel" direction. For a given adhesive and adhered surface area, a "shear" pull in a splice is stronger and resists separation at a level greater than the lower force level required to "peel" the joined components apart, as would be the case shown in FIGS. 2*d* and 2*e*. In other words, the separation force is resisted in a shear direction along the splice 115 rather than in a peel direction transversely to it. The resulting "shear" type splice provided in the invention enhances the structural integrity of the finished multi-ply label to a greater extent than any "peel" type splice, and enhances the capacity of the invention for application with plies of varied types and parameters, where desired.

The base ply 110 is typically printed with text or graphics on the upper side, but can also be printed on its lower side with text, graphics and/or an adhesive deadening coating, such coatings being well known in the trade. The upper side of the base ply is also coated with a release varnish, such varnishes being well known in the trade. This varnish allows the upper ply to be releasably attached to the base ply prior to application to a container.

Figure 9A:
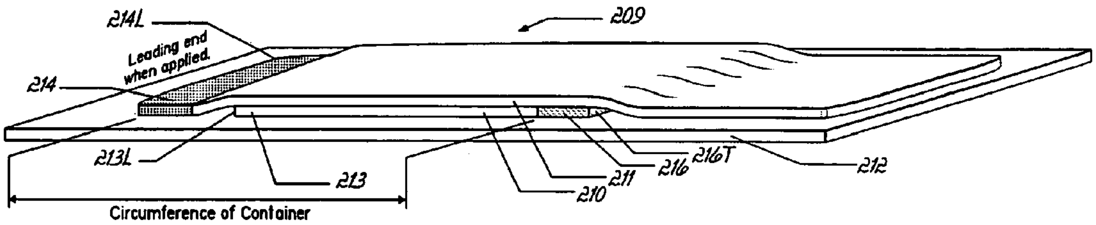
FIGS. 9*a*-9*d* illustrate a second embodiment of the invention with the leading edge of the upper ply extending forward, past the leading edge of the base ply.

The upper ply 111 is releasably affixed to the base ply 110 by means of an adhesive coating on said upper ply's underside. Said adhesive is preferably pressure sensitive and can cover substantially the full underside of the upper ply, or a portion thereof. This adhesive coating can be a solid coat or a pattern coat as desired. Alternatively, a dry-release (coupon adhesive, for example) to bond the upper and base plies has been contemplated. If the upper ply extends beyond the base ply in any direction prior to application to a container, examples being illustrated in FIG. 3*a* and FIG. 9*a*, said adhesive enables the said extended portions to be releasably affixed to a release coated liner.

The upper label ply 111 is preferably printed with text or graphics on one or both sides. A release varnish is then applied to desired areas of the upper ply's upper side forming a releasable bonding surface. After application, this releasable bonding surface enables any wrapped label layers positioned over the varnished upper ply areas to be removed and reapplied by the end user as would be desirable to view otherwise hidden text or graphics. As shown in FIG. 5*a*, the upper side of the upper ply's leading end portion 114 is typically void of such release varnish to enable the formation of a strong permanent end-splice when said portion 114 is overlapped by the base ply's trailing end portion 116 during label application as seen in FIG. 4*b*.

Figure 11A:
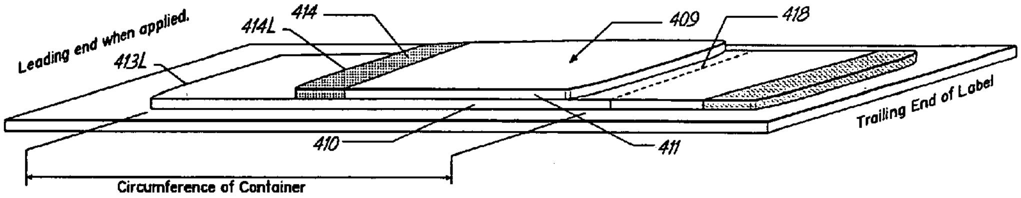
FIGS. 11*a*-11*f* illustrate a fourth embodiment of the invention.
Figure 11B:
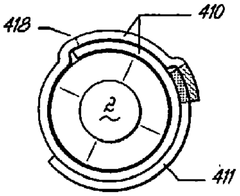
Figure 11C:
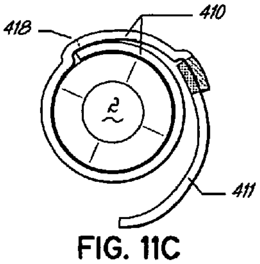
Figure 11D:
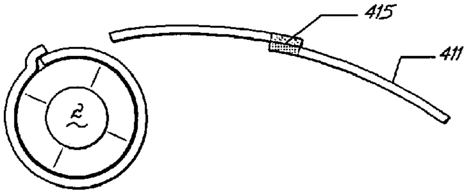
Figure 11E:
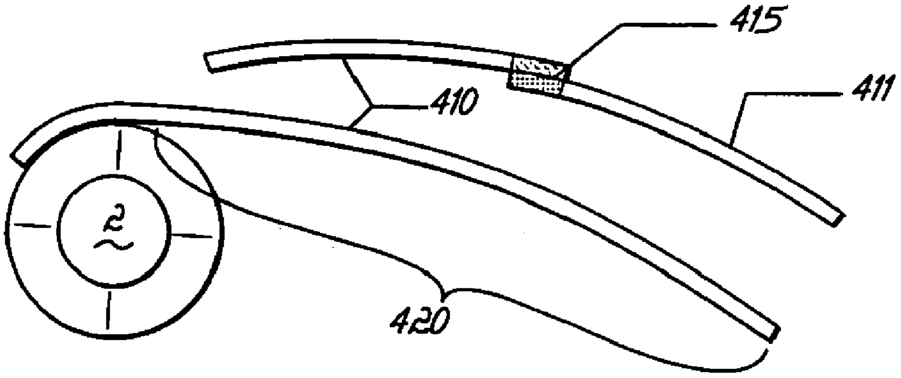

It is further appreciated that the upper and/or base ply can be partially coated on their lower side with adhesive deadeners, to lessen or eliminate the tacky, bonding properties of the pressure sensitive adhesive present on the lower side of the ply, a well known practice in the industry. After application to a container, the upper ply can be peeled back for viewing of printed text or graphics as shown in FIGS. 3*c*-3*d* and 4*d*-4*e*. By use of adhesive voids or deadeners applied to the underside of the base ply, portions of said base ply can also be peeled back for viewing its underside as is shown in FIG. 11*e*. Deadeners applied to the end portion of the base ply can also alter the size and positioning of the end-splice.

It will be appreciated that the base and upper plies are of preferably plastic material, although any suitable material for the labeling application contemplated can be used. The ply material can be conformable materials which remain conformable after application to a container and particularly to the surfaces of a container which may be deformable. Thus, labels according to the invention can be readily applied to rigid or conformable target surfaces.

It will be appreciated that all embodiments of the invention, when applied, comprise a single, multi-component label strip, for wrapping about a container or other surface and at the same time providing multi-layer label advantages.

In addition to the above general description of embodiments of the invention and of the label of the first embodiment, other embodiments are disclosed below. While the first embodiment discloses a label with coextensive leading end portions, a second embodiment teaches a label wherein the upper ply leading edge extends past the base ply leading edge (FIG. 9). A third embodiment teaches a label wherein the upper ply leading edge is recessed back from the base ply leading edge (FIG. 10). Each of these first three embodiments possesses uniquely different positioning of the end-splice as will be discussed further in detail.

A fourth embodiment (FIG. 11) is discussed herein which includes a label in which a portion of said label could be removed by the end user. This embodiment also contemplates the use of adhesive deadeners to enable the end user to view text or graphics printed on the underside of the base label.

In these descriptions, somewhat similar elements in the Figures are frequently designated by the same number or a similar number in a higher series to ease comparison between the embodiments. Different parts of elements are sometimes designated by similar numbers with letter suffixes for clarity.

In all these descriptions, uses of the word "equal" is not meant to constitute an exact number, but only the substantially equal relationship, such as shown in the drawings.

First Embodiment

It will be appreciated that labels according to the invention are applicable to a variety of target surfaces, such targets including but not limited to cylindrical containers, containers with deformable surfaces and a variety of other objects, articles and things. The terms, "target", "container," and "bottle" are used herein interchangeably with no particular or extra significance of any one of these terms.

With reference to FIGS. 3-8 and their counterparts, a label according a first embodiment of the present invention, generally denoted by the numeral 109, is shown therein. Label 109 includes a base ply 110, and an upper ply 111. A base ply leading end portion is shown as numeral 113 and an upper ply leading end portion is shown as numeral 114, each having a leading edge 113L and 114L respectively. The first embodiment has both said ply leading end portions being coextensive at their said leading edges prior to application.

The upper ply 111 is shown in FIGS. 3-5 as being longer than the base ply 110, although said upper ply could also be equal to or shorter than said base ply 110 as is illustrated in FIGS. 8*a*-8*f*.

Figure 5A:
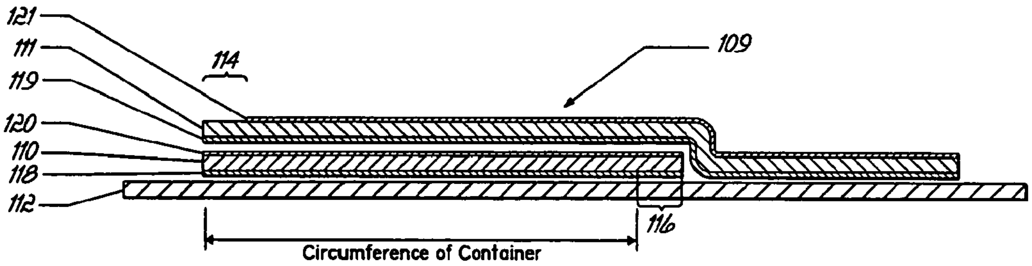
FIGS. 5*a* and 5*b* are elevational views of the invention, with FIG. 5*a* illustrating the embodiment of FIGS. 3 and 4 and FIG. 5*b* illustrating the embodiment of FIG. 5*a* in exploded view.
Figure 5B:
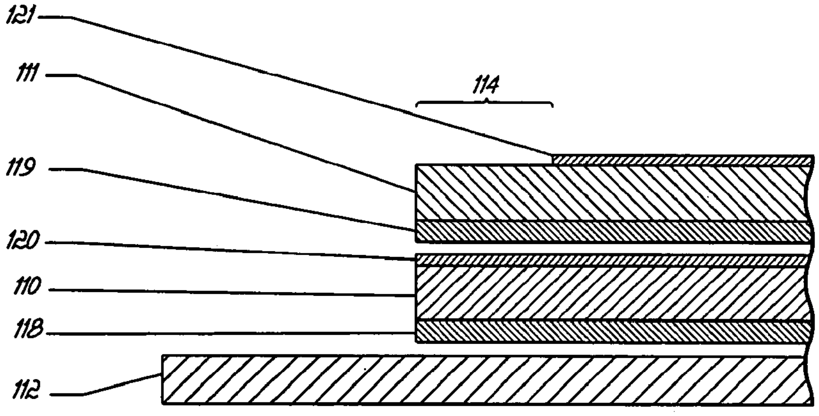

Referring to FIGS. 5*a*-5*b*, which illustrate features of the label 109, base ply 110 is coated on its lower surface with a pressure sensitive adhesive 118 and the upper ply 111 is also coated with a pressure sensitive adhesive 119 on its lower surface. Label 109 is releasably secured to a release liner 112 by means of the pressure sensitive adhesive 118 and that portion of the pressure sensitive adhesive 119 that is also in contact with release liner 112. Adhesives 118, 119 can be the same type, or different.

The base ply 110 is coated on its upper surface with a release varnish 120, such as any similar functioning varnish as are common to the trade. Said release varnish 120 will allow for the upper ply 111 to be releasably secured to upper surface of the base ply as would be the desired case after label 109 were applied to a container in a "wrap around" fashion as illustrated in FIGS. 4*a*-4*e*. Similarly, the upper ply 111 can also be coated with a release varnish 121 to enable further releasable wraps on a container if desired. Preferably, no release varnish will be applied to the upper side of the upper ply 111 in the area of the leading end portion 114 as this will be the area of permanently forming the end-splice 115. However, a release coating can be applied to the leading end portion 114, if desired, to form an end-splice bond which is releasable rather than permanent.

Although only one label 109 is shown positioned on the release liner 112, preferably a series of labels 109 are aligned along an extended length of release liner 112 (see FIGS. 6-7), both liner and labels being formed into a reel or roll for storage and future application to a container, as is the case with all embodiments taught herein.

Figure 4A:
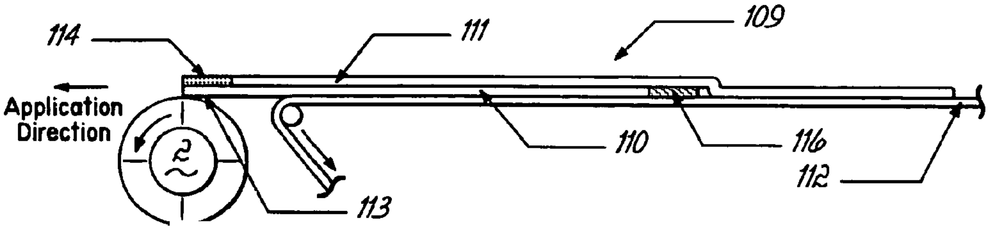
FIG. 4 is a series of cross-sectional views illustrating the machine application and subsequent viewing of the first embodiment of the invention, with FIGS. 4*a*-4*c* illustrating machine application and FIGS. 4*d*-4*e* illustrating label release and viewing.
Figure 4B:
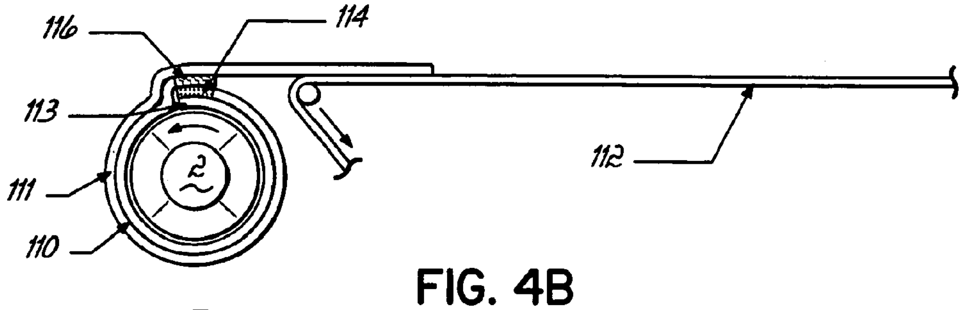
Figure 4C:
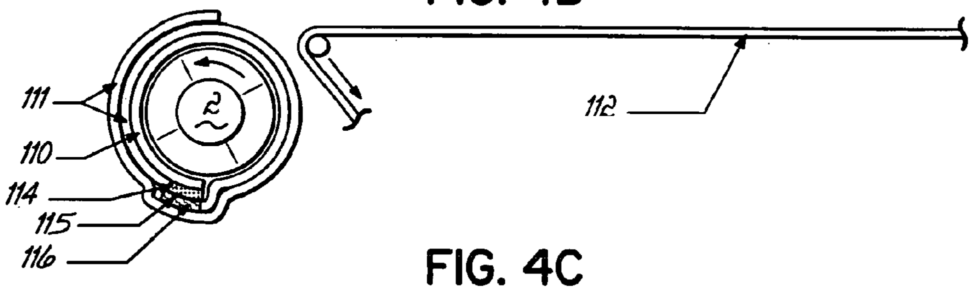

Referring to FIGS. 4a-4c, label 109 is eventually destined to be applied preferably to a container such as a round bottle 2 using a machine applicator as is common to the industry. During said application both plies 110, 111 are simultaneously released from the liner 112 and affixed to said bottle starting with leading end portions 113 and 114 of said respective plies as shown in FIG. 4a.

As the bottle 2 turns during machine application, the label 109 is applied in a continuous motion. After initial adhesive contact of the label 109 to the bottle 2 as shown in FIG. 4a, said bottle continues to rotate. FIG. 4b shows the label application after a little more that one full revolution of said bottle has been performed. At this point, the base ply 110 has been applied to the entire perimeter surface of the bottle 2, and the wrapping process has continued.

FIGS. 3 and 4 illustrate a feature of the first embodiment in which the base ply 110 measures longer that the perimeter of the bottle 2. As said base ply, with adhesive on its underside, fully wraps said bottle, the remaining length, the trailing end portion 116 of said base ply 110, overlaps the upper ply leading end portion 114, and a permanent end-splice 115 with strong shear characteristics is thereby created. In order to insure a permanent adhesive bond when forming the end-splice, the upper ply leading end portion 114 is void of release varnish on its upper surface in the end-splice 115 section. Alternatively, if release varnish were applied on the upper surface of the upper ply 111 in the said end-splice section a releasable bond would be formed rather than a permanent bond, if desired, for ultimate removal, as desired, of upper ply 111.

Completion of the label application process is shown in FIG. 4c. Although the upper ply 111 is shown wrapping the bottle approximately one and one-half revolutions, the actual length of the upper ply 111 and the associated amount of wrapping will vary based on user requirements.

Figure 4D:
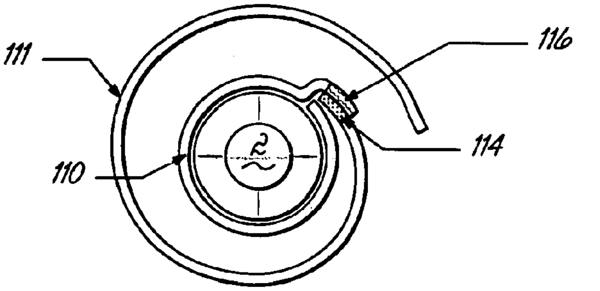
Figure 4E:
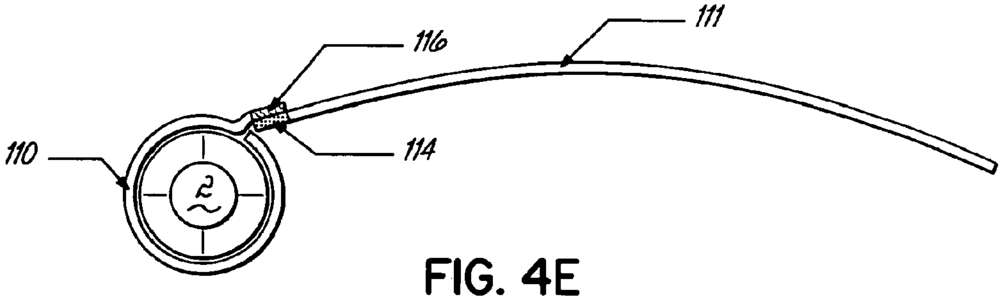

FIGS. 4d-4e illustrate the label 109 being partially, then fully opened for viewing by the end user. Printed graphics and text can be viewed on both sides of the upper ply 111 as well as on the upper side of the base ply. The appropriate placement of release varnish coatings 120 and 121 as shown in FIG. 5 allow the label to be opened and closed numerous times.

Figure 8A:
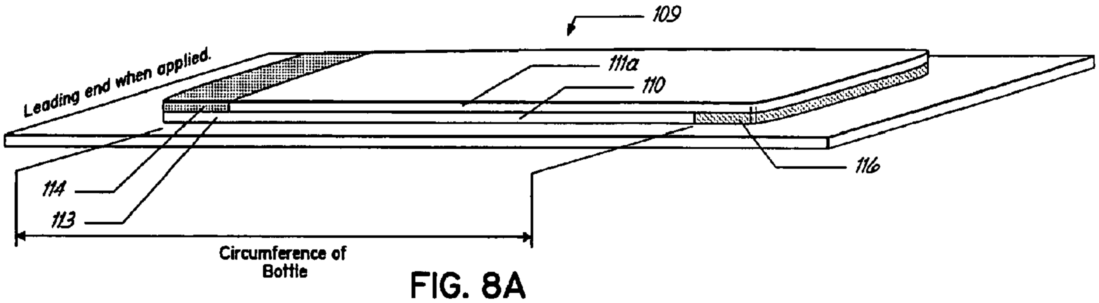
FIGS. 8*a*-8*f* illustrate the label of FIGS. 3-7 but show varying length possibilities of the upper ply as compared to length of the lower base ply.
Figure 8B:
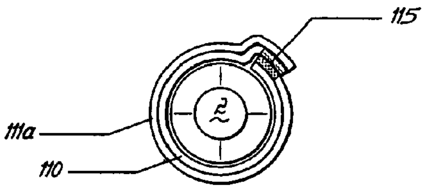
Figure 8C:
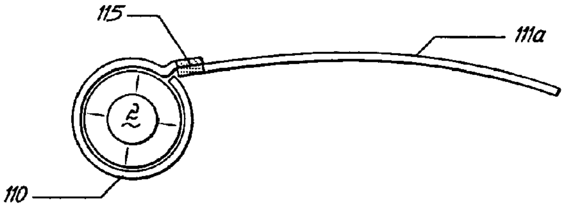
Figure 8D:
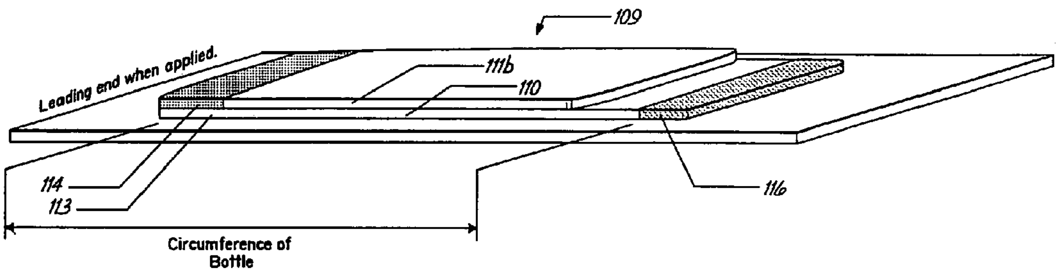
Figure 8E:
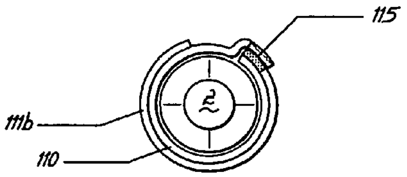
Figure 8F:
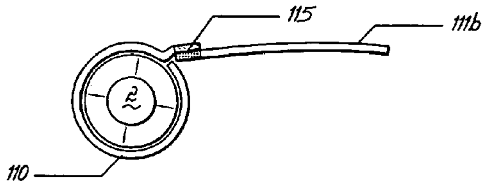

FIGS. 8a-8f show varying versions of the first embodiment of the invention wherein the upper ply 111 is of differing lengths as compared to the base ply 110. In FIG. 8a, said upper ply 111a is the same length as said base ply and, upon application, would completely "wrap" the bottle 2 and then some. FIG. 8d shows a label with an upper ply 111b shorter than the base ply 110, and said upper ply would typically not completely "wrap" the bottle 2. These are contrasted to FIG. 3 which illustrates a label with a significantly longer upper ply 111 as compared to the base ply 110, in which case multiple "wraps" greater than one of said upper ply are possible.

In FIG. 8, the end-splice 115 formed during label application is positioned starting after one full "wrap" of the base label 110. It should be appreciated that labels of the first embodiment all exhibit this same basic positioning of the starting point of the end-splice 115. This is consistently the case because the base ply 110 is longer than the circumference of the bottle. As said base ply 110 completes its initial 360° "wrap" and continues to "wrap", the excess length of material (i.e. the base ply trailing end portion 116) becomes superimposed and adhesively attached onto the upper ply leading end portion 114, thereby forming the end-splice 115.

All three versions shown in FIGS. 3-8 illustrate adherence to dimensional features intrinsic to all embodiments of this invention that are necessary to properly form an end-splice. Specifically:

The measured distance from the leading edge of the upper ply to the trailing edge of the base ply prior to application must be greater than the circumference of the container.

As is a feature in all versions of the first embodiment including those shown in FIG. 8 and FIG. 3, the upper ply leading edge is coextensive with the base ply leading edge. As such, the "... distance from the leading edge of the upper ply (and the leading edge of the coextensive base ply) to the trailing edge of the base ply prior to application ... " is by definition equal to the length of the base ply. Going further, it is therefore another feature of all versions of the first embodiment that the length of the base label "... must be greater than the circumference of the container ... " in order to properly form the end-splice according to the invention upon label application to a target surface such as a cylindrical container, for example.

As discussed above, in all versions of the first embodiment the starting point of the end-splice formed during application is located just after the initial 360° "wrap" as shown in FIG. 8 and FIG. 3. Specific dimensional elements for all versions of said first embodiment relating to the end-splice include:

a) Positioning of the end-splice "starting point": As measured from the leading edge of the base ply, the starting point in the forming of the end-splice is a distance equal to the circumference of the bottle.

b) Length of end-splice: The actual length of the end-splice is equal to the length of the base ply minus the circumference of the bottle.

It should be appreciated that said starting point and actual length of the end-splice, including its position, could be altered by design modifications such as the use of release varnishes, adhesive deadeners, adhesive voids, or the like, as would be the case with all embodiments discussed herein.

For example, referring to FIGS. 3a and 3b, if the adhesive on the undersurface of trailing end portion 116 extended only partially into said portion from the trailing edge 116T, the resultant starting point for the splice as described above would be measurably more than the circumference when label 109 is applied to a container.

Second Embodiment

With reference to FIGS. 9a-9d, a label according a second embodiment of the present invention, generally denoted by the numeral 209, is shown therein. Label 209 includes a base ply 210, and an upper ply 211. As in the first embodiment the entire length of the upper ply 211 could be longer than, equal to, or shorter than base ply 210.

Unlike the first embodiment, a feature of the second embodiment has the upper ply leading end portion 214 of label 209 as not being coextensive with the base ply leading end portion 213 prior to application. Specifically, all labels of the second embodiment feature the upper ply leading edge 214L extending forward, past the base ply leading edge 213L. As such, during machine application to a container such as a round bottle 2, the upper ply leading end portion 214 will become affixed to said bottle prior to the base ply 210 being affixed.

Figure 9B:
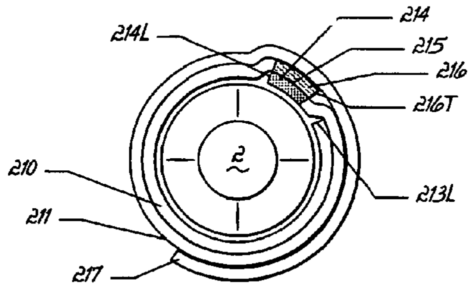
Figure 9C:
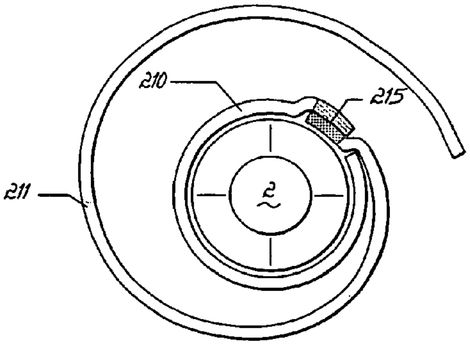
Figure 9D:
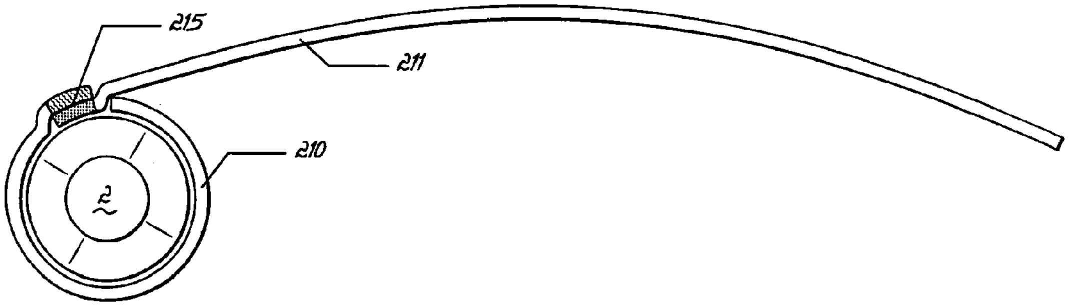

The end result, after application to the bottle 2, is that the end-splice 215 will be partially or totally positioned short of the first full "wrap" as shown in FIGS. 9b-9d. As such this end-splice will be adhesively affixed to the bottle, even when opened for viewing by the end user as shown in FIG. 9d. This alternate positioning of the end-splice 215 adds even more strength to the end-splice, renders it less obvious to the user, and may aid in the placement of text and graphics.

In all versions of the second embodiment, the starting point of the end-splice formed during application is located prior to one full wrap of the bottle as shown in FIGS. 9*b*-9*d*. Specific dimensional elements for all versions of said second embodiment relating to the end-splice include:

a) Positioning of the end-splice "starting point": As measured from the leading edge of the base ply, the starting point in the forming of the end-splice is a distance equal to the circumference of the bottle minus the distance between the upper ply leading edge and the base ply leading edge prior to application.

b) Length of end-splice: The actual length of the end-splice is equal to the length of the base ply minus the circumference of the bottle plus the distance between the upper ply leading edge and the base ply leading edge prior to application.

Third Embodiment

With reference to FIGS. 10*a*-10*d*, a label according a third embodiment of the present invention, generally denoted by the numeral 309, is shown therein. Label 309 includes a base ply 310, and an upper ply 311. As in the first and second embodiments the entire length of the upper ply 311 could be longer than, equal to, or shorter than base ply 310.

Figure 10A:
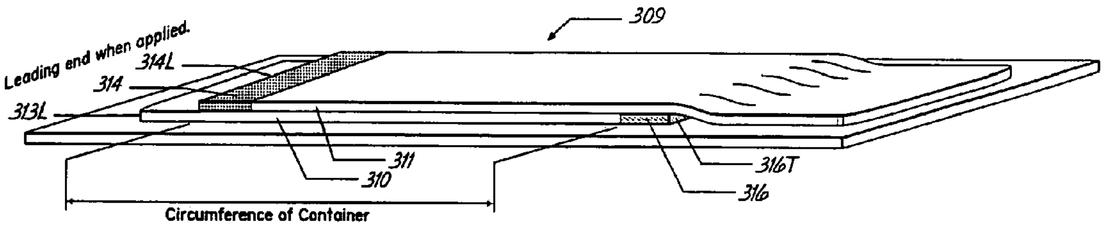
FIGS. 10*a*-10*d* illustrate a third embodiment of the invention with the leading edge of the upper ply recessed from leading edge of the base ply.

Unlike the first and second embodiments, the third embodiment features the upper ply leading edge 314L of label 309 as being recessed in relation to the base ply leading edge 313L prior to application as illustrated in FIG. 10*a*. As such, during machine application to a container such as a round bottle 2, the base ply 310 will become adhesively affixed to bottle 2 with a full 360° "wrap" and continue to wrap on itself for a distance more. Eventually during the application process, the base ply 310, with adhesive on its underside, will encounter and superimpose (overlap) its trailing end portion 316 over the upper ply leading end portion 314. The end result will be that the end-splice 315 will be formed at a point distinctly past the first 360° wrap.

Figure 10B:
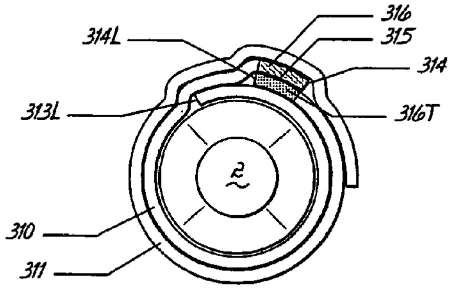
Figure 10C:
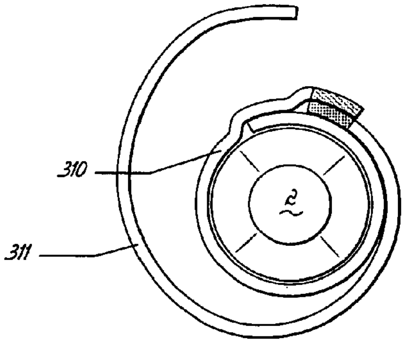
Figure 10D:
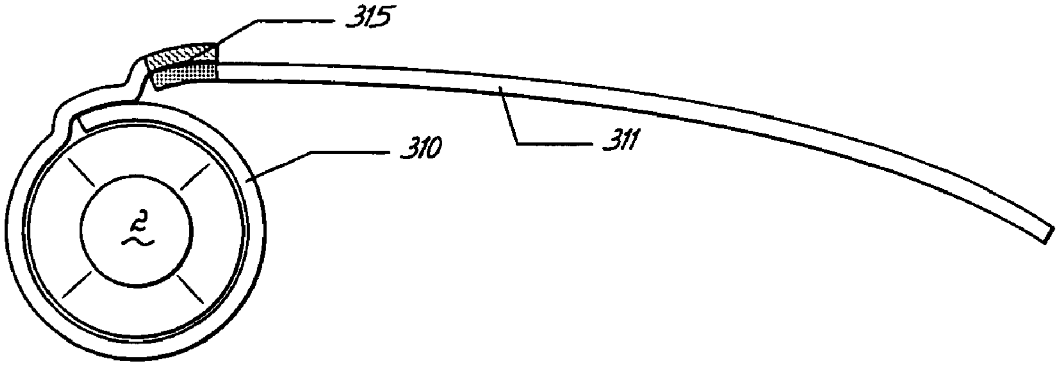

In all versions of the third embodiment the starting point of the end-splice formed during application is located some distance after one full wrap of the bottle as shown in FIGS. 10*b*-10*d*. Specific dimensional elements for the all versions of said third embodiment relating to the end-splice include:

a) Positioning of the end-splice "starting point": As measured from the leading edge of the base ply, the starting point in the forming of the end-splice is equal to the circumference of the bottle plus the length of the base ply extension past the upper ply prior to application.

b) Length of end-splice: The actual length of the end-splice is equal to the length of the base ply minus the distance from the leading edge of the base ply to starting point of the end-splice.

Fourth Embodiment

With reference to FIGS. 11*a*-11*f*, a label according a fourth embodiment of the present invention, generally denoted by the numeral 409, is shown therein. Label 409 includes a base ply 410, and an upper ply 411.

Figure 11F:
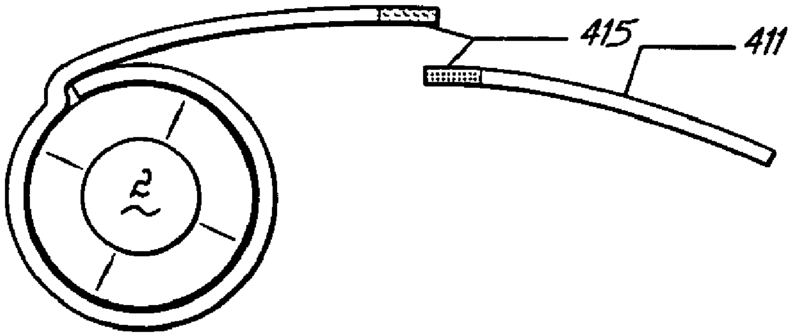

The fourth embodiment contemplates a label 409 in which, after being affixed to a container such as a bottle 2, a portion of, or the entire upper ply and, if desired, a portion of the base ply can be separated and thus removed by the end user. This is accomplished by the addition of a cut or perforation 418 in either ply, an example being shown in FIG. 11*b*-11*d*. Alternatively, separation of the upper ply 411 by the end user could be accomplished by use of a release varnish coating applied to the upper ply in the area of the end-splice forming a releasable bond rather than a permanent bond as shown in FIG. 11*f*.

Additionally, as shown in FIG. 11*e*, a portion 420 of the underside of the base ply 410 can be coated with an adhesive deadener and preferably printed with text and/or graphics. Said adhesive deadener eliminates the adhesive bonding between said portion 420 of the base ply 410 and the bottle 2. This deadened adhesive portion can thereby be lifted away from the bottle for viewing of said text and/or graphics by the end user as illustrated.

As in all other embodiments discussed, the fourth embodiment allows for the entire length of the upper ply 411 to be longer than, equal to, or shorter than base ply 410. Additionally, the upper ply leading edge 414L could be co-extensive with, recessed from, or forward of the base ply leading edge 413L.

It will be appreciated that in all embodiments discussed, both the upper and lower base plies of the label are typically composed of a paper or flexible synthetic film, clear or opaque. The upper and lower plies can be of the same or different material. For example, the upper ply could be clear, allowing viewing of portions of the base ply without removing the upper ply. The plies could also be varied to accommodate varied requirements of varied printing processes or adhesive systems, or for purely aesthetic reasons.

It is also appreciated that the size and shape of the labels of this invention can vary based on such factors as may be dictated by container size and shape or other artistic or practical requirements. With the exception of the dimensional restrictions described herein, the size and shape of the upper ply can vary as compared to the base ply to suit requirements yet to be contemplated.

Figure 6:
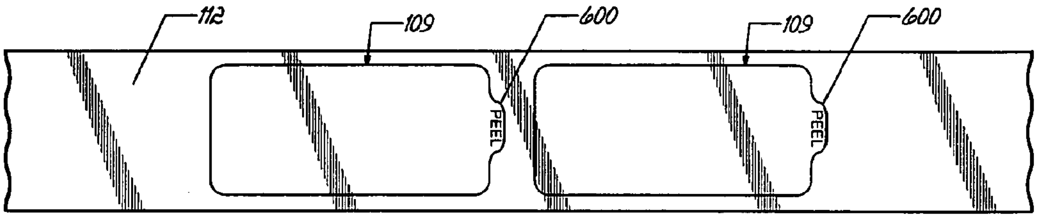
FIG. 6 is a plan view illustrating labels according to FIGS. 3-5 on a liner with the addition of a marked peel tab.

It is also appreciated that special peel tabs can be incorporated into the label designs of this invention. For example, peel tab areas 600 can be formed by simply deadening the adhesive on a label ply in a selected "peel here" area and/or extending a portion of the label as seen in FIG. 6, a well-known industry practice.

Figure 7:
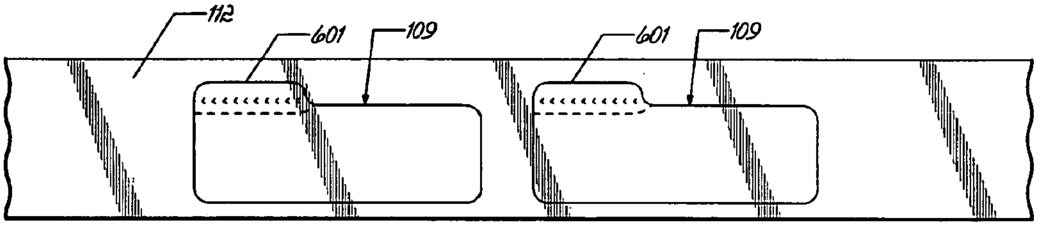
FIG. 7 is a plan view similar to FIG. 6 but showing labels according to FIGS. 3-5 with the addition of a tamper-evident tab.

It is additionally appreciated that special tamper-evident tabs 601 can be incorporated into the label embodiments of this invention. A tamper evident tab extension 601 can be envisioned as being formed in the base ply or in the upper ply as seen in FIG. 7. Those knowledgeable in the trade will recognize a wide assortment of tamper tab designs could be incorporated in the upper and/or base plies.

Additionally, in all embodiments herein, the base and/or the upper ply may contain a score, perforation, or cut in order for the user to remove a portion of the label as would be desired with a coupon or return-response sheet.

Further, it will be appreciated that labels described can be provided with "peel" tabs as in FIG. 7 or tamper evident tabs (FIG. 7), and that labels as described can be applied via processes as in or similar to that illustrated in FIGS. 4*a*-4*c*.

The containers contemplated for use of this invention may be flat, curved, tapered, faceted, or non-planar. They may be ridged, semi-ridged or conformable, being formed out of any of the materials known in the packaging industry for forming such containers. Also, labels described herein, while having preferred application to containers, may also be adapted to other forms of surfaces or angles as will be appreciated.

It should also be appreciated that discussion herein relating to measured distances are subject to adjustment based on variations in the thickness of the materials used. When measured prior to application, all measurements from one point to another are meant as would be exhibited on a label lying in a flat or "developed" format. Measurement made after application are meant to be taken around the perimeter of the container, such as circumferentially, rather than a "least-distance" method.

Further, it will be appreciated that the dimensional elements or principles recited serve to distinguish the various embodiments, all of which fall within the general dimensional principle first discussed above.

Method of Production

It is desirable to manufacture multi-ply labels in a manner that maintains strict registration between all printed matter and all die cutting (label perimeters). In addition, a method of production is desired that minimizes material waste and production labor.

Accordingly, this invention contemplates the complete manufacture of the multi-ply labels described herein using a "single press pass" instead of a sequence of separate operations as is common in other methods. This process can be accomplished using primarily standard roll-fed label presses as are common in the industry, produced by companies such as Nilpeter, Mark Andy, and Arsoma, but modified according to the invention. Modifications include the use of readily available press additions such as an extra stock unwind, turn bars, a delamination-relamination apparatus and assorted extra support rollers, all commonly used and available tools in the label manufacturing industry, but uniquely combined according to the invention to be useful in manufacturing such new labels as are described above.

Figure 12:
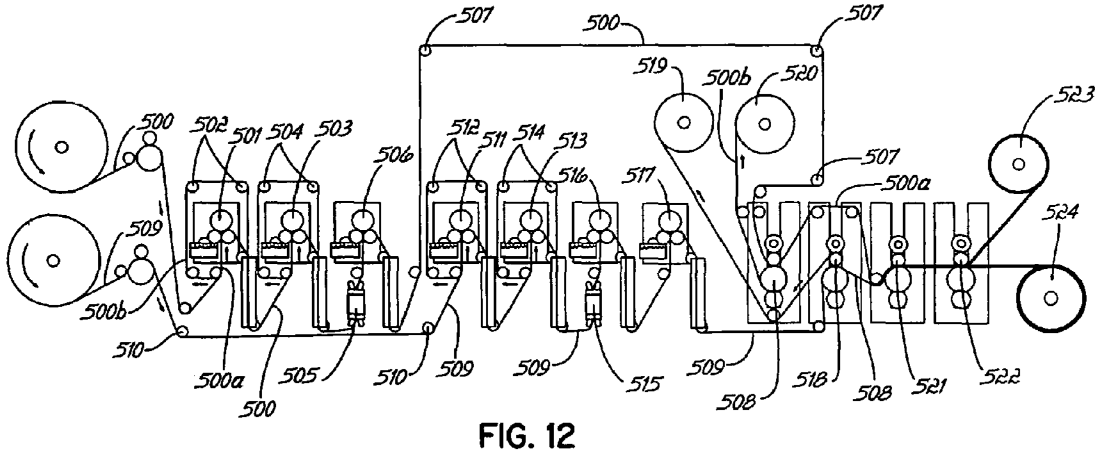
FIG. 12 depicts in elevational schematic view an exemplary apparatus and method for making a label in accordance with the present invention.

FIG. 12 illustrates schematically a process for making such labels. A web 500 from which will be defied a series of upper plies or labels is unwound and introduced into the printing section of label press. This web is preferably composed of a plastic film with a pressure-sensitive adhesive on its underside with said film and adhesive removably affixed to a paper or film release support liner, which said liner is later discarded during the process. The web 500, with the liner face up, is then "split" into two webs, 500*a*, 500*b*, by temporarily separating the plastic film with its adhesive coating 500*a* from the liner 500*b*. The newly exposed adhesive side of the upper ply is then printed with desired text, graphics, or coating using print station 501. The separated liner web 500*b* is diverted around the print station 501 using a series of rollers collectively termed a delamination-relamination apparatus 502, which units are of common use in the industry. The liner and plastic film with its newly printed adhesive are then recombined as a single web 500. If desired, additional colors or coatings can be printed on the upper label ply adhesive by repeating the steps of delamination-print-relamination as previously described. For example, print station 503 is shown with its associated delamination-relamination apparatus 504, as printing an adhesive deadener on the once-again exposed adhesive of the upper label ply. The liner is then rejoined to the said plastic film and held in place by the non-deadened areas of adhesive on the upper label ply film.

After all desired printing has been performed on the adhesive surface of the upper web 500, the web is flipped over using a tumbar apparatus 505, which is a common structure in the industry.

This upper label web 500 is then printed on its top surface with the desired text and graphics. Although FIG. 12 shows one print station 506 for printing on the top surface of the upper web, it is appreciated that a series of print stations would be required if multiple colors or coatings were desired on the top surface of the upper web 500.

The upper web 500 is then diverted past the remaining print stations by use of a series of elevated rollers 507 and is fed into the first die cut section of the press via the print pacing roll 508.

A lower web 509 defining a series of label base plies is concurrently unwound into the same label press. This web is also preferably composed of a plastic film with a pressure-sensitive adhesive on its underside and has a release support liner. Unlike the upper web liner, the lower web liner will not be discarded as waste, but rather will remain as a support web (see 112 in FIG. 3, for example) for the final multi-ply labels which are normally kept in rolls until used.

The lower web 509 is diverted past those stations used in printing the upper web 500 by a series of rollers 510 and is then fed into one or more print stations 511 then "split" into two webs by temporarily separating the plastic film with its adhesive coating from the liner (as with web 500). The newly exposed adhesive side of the plastic film is then printed with desired text, graphics, or coating using print station 511. The separated liner web is diverted around the print station 511 using a delamination-relamination apparatus 512. The liner and plastic film with its newly printed adhesive are then recombined as a single web. If desired, additional colors or coatings can be printed-on the lower label ply adhesive by repeating the steps of delamination-print-relamination as previously described. For example, print station 513 is shown with its associated delamination-relamination apparatus 514, as printing an adhesive deadener on the once-again exposed adhesive of the upper label. The liner is then rejoined to the said plastic film and held in place by the non-deadened areas of adhesive on the lower label ply film.

After all desired printing has been performed on the adhesive surface of the base web 509, the web is flipped over using a tumbar apparatus 515. This base label web 509 is printed on its top surface with the desired text and graphics. Although FIG. 12 shows one print station 516 for printing on the top surface of said base label web, it is appreciated that a series of print stations would be required if multiple colors were desired on the top surface of the base web 500. A final print station 517 prints the release coating, enabling the finished label to be opened and viewed, as described above.

Next, the lower web 509 is fed into a die station 518 where the web material is die cut through the plastic film and adhesive, but not through the liner, to thereby form the basic shape of the base ply (which may be altered somewhat at a later stage, as will be described). Excess film not used in the formation of the base ply is then stripped away as a waste matrix roll 519.

Prior to joining the two webs 500 and 509, the upper label web 500*a* is again "split" from the support liner 500*b* at the print pacing roll 508. This time the liner 500*b* is permanently removed from the film 500*a* and associated adhesive and is rewound into a roll 520 for discarding.

The remainder of upper label ply web 500*a* with its now exposed adhesive on its underside is then joined by a lamination roll 521 to the base ply web 509 which now has excess material removed as described above. A second die cut roll 522 forms the perimeter shape of the upper label. This die cut extends through both the upper label web 500*a* and any portion of the base labels that are in the path of the die cut. It does not cut through the base label release support liner. Thus, this second die cut can alter the shape of the base label and make the upper and lower labels coextensive where the second die cut is in the path of the base label ply.

Finally, the excess upper label and base label material is stripped away onto waste matrix roll 523, leaving the final multi-ply labels on a support liner to be wound into a label supply roll 524 for storage and eventual use.

It will be appreciated that the foregoing method as described can be used to produce the invention and its various embodiments described above. The dimensional and configuration parameters of the rotary cutting dies are selected to provide the varied forms of and the embodiments of the new and improved labels described above.

It will also be appreciated that the methods described, while using available web handling, printing and laminating structures, contemplate the unique combination of such structures in heretofore unknown manner in order to produce the improved multi-ply wrap labels as described above, and not heretofore known. Any suitable mechanisms can be used, but in the new combination as described, to accomplish the foregoing methods as will be readily apparent from this disclosure.

Moreover, it will be appreciated that the multi-ply wrap labels described herein are particularly useful in labeling of containers, such as vials, having very small diameters, yet the labels provide extensive printable surface area for printing and then viewing in use, with label retention or separation as desired without undue stretching, splitting or buckling, and with a rigidity of construction enhancing and facilitating the application process. Use on larger diameter packages, cartons or containers is, of course, contemplated, as well as use on other surfaces.

Still further, the label constructions of this invention enhance the ability to provide multiple material labels with components having different adhesion, viewing and printing parameters, substantially adding to the functionality of the labeling process, while at the same time providing benefits of a roll fed, unitary wrap label.

Adhesion between label components is enhanced and is provided in primarily "shear" configuration as opposed to weaker "peel" configuration.

Producers of consumer goods, pharmaceuticals and other label users are thus provided with choices in "ECL" type labels not heretofore possible, together with the prior "wrap" label configuration.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A method of forming, in a single pass, a multi-ply label for application to a container having a known circumference, said label having an upper ply and a base ply with respective overlapping leading and trailing ends defining an end splice on application to said container, said method comprising the steps of:

- feeding a first composite web comprising a liner and a releasably adhered upper ply to a press;
- splitting said liner from said film;
- printing one side of said film;
- recombining said liner and said film;
- turning said web 180 degrees;
- printing another side of said film;
- feeding a second composite web comprising a base liner and releasably adhered base ply;
- splitting said base liner and said base ply;
- printing one side of said base ply;
- recombining said base liner and base ply;
- turning said second composite web 180 degrees;
- printing on another surface of said base ply;
- introducing said second web to a die cutting station and cutting said base ply on said base liner, thereby forming a series of separate base label plies on said liner each of said base label plies having a trailing end portion with an under surface;
- stripping away any portions of said base ply that are outside said series of base label plies;
- splitting said liner and upper ply of said composite web;
- removing said liner;
- joining said upper ply to said second composite web;
- cutting said upper ply to form a series of separate upper label plies on and in operative register with respective ones of said series of separate base label plies each of said upper label plies having a leading end portion with an upper surface, wherein an adhesive is disposed on said under surface of said base ply trailing end such that said adhesive is in a position to engage and adhere to said upper surface of the said leading end portion of said upper ply upon application of such label to a target surface;
- stripping portions of said upper ply that are outside said upper label plies; and
- rolling said base liner, carrying said base plies and upper label plies thereon, into a multi-ply label supply.

2. The method of claim 1, wherein the step of cutting said upper ply includes cutting through portions of said base label plies.

3. The method of claim 2, wherein said stripping of said upper ply includes stripping portions of said separate base label plies that are cut away when said separate upper label plies are formed.

4. A method of forming, in a single pass, a multi-ply label for application to a container having a known circumference, said label having an upper ply and a base ply with respective overlapping leading and trailing ends defining an end splice on application to said container, said method comprising the steps of:

- providing an upper web including said upper ply and a liner, said upper ply defining an adhesive surface and a top surface;
- providing a lower web including said base ply and a release support liner, said base ply defining an adhesive surface and a top surface;
- splitting said upper ply and said liner;
- printing on said adhesive surface of said upper ply;
- recombining said upper ply and said liner;
- flipping said upper web;
- printing on said top surface of said upper ply;
- feeding said upper web into a die cut section;
- splitting said base ply and said release support liner;

printing on said adhesive surface of said base ply;

recombining said release support liner and said base ply;

flipping said lower web;

printing on said top surface of said base ply;

feeding said lower web into said die cut station;

cutting through said base ply of said lower web without cutting through said release support liner;

to thereby form a series of separate base label plies on said release support liner, each of said base label plies having a trailing end portion with an under surface;

splitting said upper ply of said upper web from said support liner;

joining said upper ply to said base ply of said lower web: and;

cutting through said upper ply and any portion of said base label plies in the path of this cut without cutting through said release support liner to form a series of separate upper label plies on and in operative register with respective ones of said series of separate base label plies, each of said upper label plies having a leading end portion with an upper surfaces, wherein an adhesive is disposed on said under surfaces of said base ply trailing end such that said adhesive is in a position to engage and adhere to said upper surfaces of said leading end portion of said upper ply upon application of such label to a target surfaces.

5. The method of claim 4, wherein said upper ply and said liner are split and recombined a plurality of times, with said adhesive side of said upper ply being printed a plurality of times.

6. The method of claim 4, wherein said top surface of said upper ply is printed using a plurality of print stations.

7. The method of claim 4, wherein said base ply and said release support liner are split and recombined a plurality of times, with said adhesive side of said lower ply being printed a plurality of times.

8. The method of claim 4, wherein said top surface of said base ply is printed using a plurality of print stations.

9. The method of claim 4, wherein said flipping steps are accomplished by utilizing a turnbar apparatus.

10. A method of forming, in a single pass, a multi-ply label for application to a container having a known circumference, said method comprising the steps of:

providing an upper web including an upper ply and a liner, said upper ply defining an adhesive surface and a top surface;

providing a lower web including a base ply and a release support liner, said base ply defining an adhesive surface and a top surface;

printing on each surface of said upper ply;

printing on each surface of said lower ply;

feeding said lower web into a die cut section;

cutting said base ply on said release support liner, forming a series of separate base label plies on said release support liner each of said base label plies having a trailing end portion with an under surface;

joining said upper ply to said lower web; and cutting said upper ply to form a series of separate upper label plies in operative register with respective ones of said series of separate base label plies, each of said upper label plies having a leading end portion with an upper surface, wherein an adhesive is disposed on said under surface of said base ply trailing end such that said adhesive is in a position to engage and adhere to said upper surface of said leading end portion of said upper ply upon application of such label to a target surface.

11. The method of claim 10, further comprising the steps of splitting said upper ply and said liner prior to printing on said upper ply and recombining said upper ply and said liner after printing on said upper ply.

12. The method of claim 10, further comprising a step of flipping said upper web prior to printing on said top surface of said upper ply.

13. The method of claim 10, further comprising a step of removing said liner prior to joining said upper ply to said lower web.

14. The method of claim 10, further comprising a step of stripping away portions of said base ply outside said series of base label plies.

15. The method of claim 10, wherein the step of cutting said upper ply includes cutting through portions of said base label plies.

16. The method of claim 15, wherein said stripping of said upper ply includes stripping portions of said separate base label plies cut away when said separate upper label plies are formed.

* * * * *

UNITED STATES PATENT AND TRADEMARK OFFICE

CERTIFICATE OF CORRECTION

PATENT NO. : 7,875,142 B2
APPLICATION NO. : 12/577634
DATED : January 25, 2011
INVENTOR(S) : Lowell F. Matthews et al.

It is certified that error appears in the above-identified patent and that said Letters Patent is hereby corrected as shown below:

In the claims:
Claim 1, Column 16, Line 6:
“said film” should read --said uppler ply--
Claim 1, Column 16, Line 7:
“said film” should read --said uppler ply--
Claim 1, Column 16, Line 8:
“said film” should read --said uppler ply--
Claim 1, Column 16, Line 10:
“said film” should read --said uppler ply--
Claim 1, Column 16, Line 20:
insert --,-- after “liner”
Claim 4, Column 17, Line 22:
“surfaces” should read --surface--
Claim 4, Column 17, Line 23:
“surfaces” should read --surface--
Claim 4, Column 17, Line 25:
“surfaces” should read --surface--
Claim 4, Column 17, Line 25:
“surfaces” should read --surface--
Claim 4, Column 17, Line 15:
delete “;”
Claim 10, Column 18, Line 12:
insert --,-- after “liner”

Signed and Sealed this
Twentieth Day of September, 2011

David J. Kappos
*Director of the United States Patent and Trademark Office*